US012737691B2

(12) United States Patent
Borghese et al.

(10) Patent No.: US 12,737,691 B2
(45) Date of Patent: Sep. 15, 2026

(54) TECHNIQUES FOR CONCURRENT OBJECT IDENTIFICATION

(71) Applicant: THE HUNTINGTON NATIONAL BANK, Columbus, OH (US)

(72) Inventors: Beth Borghese, Columbus, OH (US); Alireza Khakpour, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/449,964

(22) Filed: Jan. 15, 2026

(65) Prior Publication Data

US 2026/0195880 A1 Jul. 9, 2026

Related U.S. Application Data

(63) Continuation of application No. 19/009,280, filed on Jan. 3, 2025, now Pat. No. 12,548,134.

(51) Int. Cl.
*G06T 7/00* (2017.01)
*G06V 30/42* (2022.01)
*H04N 7/14* (2006.01)

(52) U.S. Cl.
CPC ............ *G06T 7/0002* (2013.01); *G06V 30/42* (2022.01); *H04N 7/147* (2013.01); *G06T 2207/30168* (2013.01)

(58) Field of Classification Search
CPC ...... G06N 20/00; G06Q 40/12; G06V 10/774; G06V 10/764
USPC .......................................................... 382/112
See application file for complete search history.

(56) References Cited

FOREIGN PATENT DOCUMENTS

CN 111986015 A 11/2020

OTHER PUBLICATIONS

Manjunath, Akanksh A., et al. "Design thinking approach to simplify monetary transactions for the people with visual impairment." British Journal of Visual Impairment 41.2 (2023): 265-285. (Year: 2023).*

(Continued)

*Primary Examiner* — Jonathan S Lee
(74) *Attorney, Agent, or Firm* — Kilpatrick Townsend & Stockton LLP

(57) ABSTRACT

An example method may include receiving, from a mobile device, image information representing an image that includes a depiction of a media of exchange. The method may also include providing the image information as input to a machine learning model implemented by the remote computing device. The method may also include receiving, from the machine learning model, an output comprising a classification and a confidence score, the classification comprising a quantity that corresponds to the media of exchange, the confidence score comprising a probability that the media of exchange in the image corresponds to the quantity. The method may also include comparing the confidence score with respect to one or more evaluation criteria. The method may also include, in response to comparing, providing a user interface for presentation at the mobile device, the user interface comprising an option for establishing a communication channel.

20 Claims, 8 Drawing Sheets

(56) References Cited

OTHER PUBLICATIONS

De Silva, D. I., et al. "Enhancing learning experiences for visually impaired students with AI and machine learning on smart device." 2024 International Congress on Human-Computer Interaction, Optimization and Robotic Applications (HORA). IEEE, 2024. (Year: 2024).*

Holton, Bill. "A Review of the Be My Eyes Remote Sighted Helper App for Apple iOS." AFB AccessWorld Magazine 16.2 (2015). (Year: 2015).*

U.S. Appl. No. 19/010,545, "Notice of Allowance", Mar. 17, 2025, 10 pages.

Jacob, et al., "CashGrab", Available online at: https://summit.sfu.ca/item/36736, Aug. 6, 2023, 22 pages.

Madake, et al., "Financial Inclusion for Visually Impaired People using YOLOv7Bank+ based Mobile Application", 15th International Conference on Computing Communication and Networking Technologies (ICCCNT), Jun. 28, 2024, 11 pages.

* cited by examiner

TECHNIQUES FOR CONCURRENT OBJECT IDENTIFICATION

CROSS-REFERENCE TO RELATED APPLICATION

This application is a continuation of U.S. patent application Ser. No. 19/009,280, filed Jan. 3, 2025, the entirety of which is hereby incorporated by reference.

TECHNICAL FIELD

The disclosure is generally directed to machine learning models. Specifically, the disclosure is directed to techniques for generating input to machine learning models for concurrent object identification.

BACKGROUND

Machine learning models can be used to identify objects, and a model may be used to detect a medium of exchange in an image. A model performing object identification may be hosted on a remote computing device, and separate images may be required for each medium of exchange. The images may be sent to these models are sent over a network connection, and identifying multiple media of exchange can be computationally intensive. Accordingly, improvements to object identification techniques are desirable.

BRIEF SUMMARY

The techniques may include capturing an image that includes a depiction of the media of exchange. In addition, the techniques may include communicating image information representing the image to a remote computing device that is configured to execute a machine learning model that receives as input the image information and outputs a quantity that corresponds to the media of exchange. The techniques may include receiving a quantity that corresponds to the media of exchange and a confidence score that includes a probability that the media of exchange in the image corresponds to the quantity. Moreover, the techniques may include comparing the confidence score with respect to one or more evaluation criteria. Also, the techniques may include in response to the comparing, presenting, via a user interface, an option for establishing a communication channel. Further, the techniques may include in response to receiving input from the user interface, establishing the communication channel.

The techniques may include detecting a repository value change for an account. In addition, the techniques may include receiving image information representing an image from a computing device that is associated with the account, where the image includes a depiction of the media of exchange. The techniques may include generating a feature vector for the image, where the feature vector is generated based at least in part on the image information, and where the feature vector may include numeric properties of the image. Moreover, the techniques may include associating the feature vector and the repository value change, thereby generating a labeled training datum. Also, the techniques may include adding the labeled training datum to a set of labeled training data. Further, the techniques may include using the set of labeled training data to train a machine learning model that is configured to receive as input the image information and output a quantity that corresponds to the media of exchange.

Implementations of these techniques can include corresponding methods, computer systems, apparatus, and computer programs recorded on one or more transitory or non-transitory computer storage devices (e.g., computer-readable media), each configured to perform the actions of the techniques.

BRIEF DESCRIPTION OF THE DRAWINGS

Various embodiments in accordance with the present disclosure will be described with reference to the drawings, in which.

DETAILED DESCRIPTION

Figure 1:
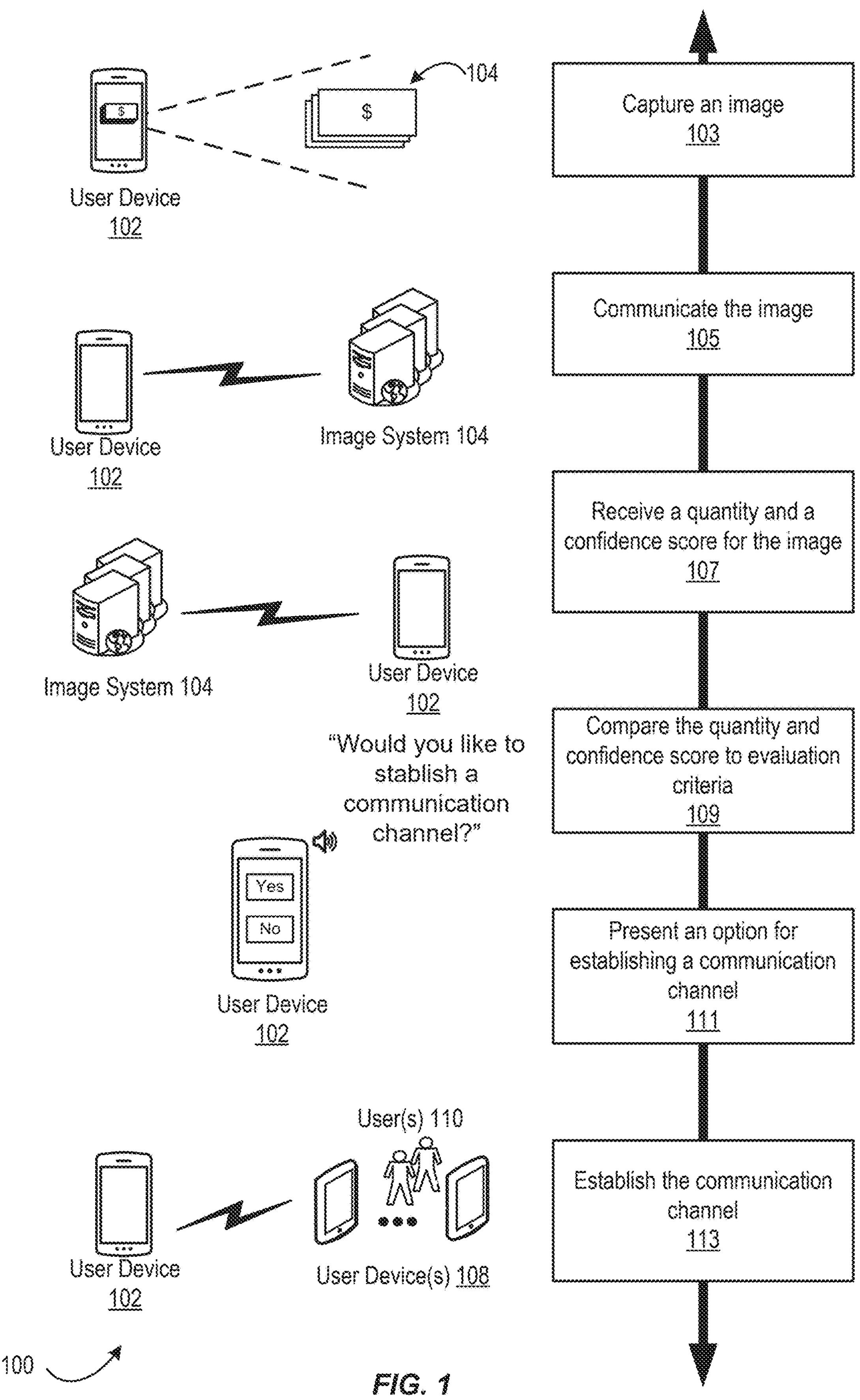
FIG. 1 is an example flow for object identification, in accordance with at least one embodiment.

In the following description, various embodiments will be described. For purposes of explanation, specific configurations, and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to techniques for classifying images based on the amount of media of exchange that is depicted in each image. The images, or information about the images, can be input into a machine learning model, and the machine learning model can use the input information to identify objects that are depicted in the image. The objects can be media of exchange such as notes or coins of a currency. Each object can be associated with a value, and the techniques can include summing these values for each object to determine the amount of the media of exchange that is depicted in the image.

The information about an image may be represented as an ordered list of numeric representations of the image's properties (e.g., an n-dimensional feature vector). The machine learning model can plot the feature vectors in an n-dimensional embedded space (e.g., feature space) where each axis in the space corresponds to one of the image's n properties. The image may be classified as including a depiction of a particular medium of exchange depending on where the feature vector is plotted in feature space. For example, the model may assign a confidence score to the image's feature vector, and the confidence score may depend on how closely the feature vector is plotted near known feature vectors that correspond to images with known quantities. The confidence score may be higher if the feature vector is plotted near known feature vectors (e.g., the Euclidian distance is close), and the confidence score may be lower if the feature vector is plotted away from known feature vectors (e.g., the Euclidian distance is far apart).

The machine learning model may be used to assist a visually impaired user determining an amount of currency. Individuals with visual impairments traditionally rely on assistance from others to determine the amount of media of exchange (e.g., an amount of currency). This reliance can mean that visually impaired individuals are susceptible to deception because they rely on strangers for accurate currency valuations. Visually impaired individuals may benefit from techniques that allow them to accurately determine a quantity of media of exchange without relying on a stranger who may benefit from reporting an inaccurate currency amount. For example, a cashier may have an incentive to underreport the change from a transaction so that the cashier can retain the underreported cash. In addition, asking a third party to verify the amount can signal that a potentially vulnerable individual is in possession of physical currency.

The disclosed techniques can improve the functioning of a computer system. For example, the techniques can be used to determine the quantity of media of exchange for an image that depicts multiple bills or coins of a currency. The classification may be performed by a remote computer system, and using a single image that depicts multiple bills or coins can improve the functioning of the computer system by reducing the number of images that are sent over a network. Reducing the number of images can reduce the storage requirements of the device capturing the images and the remote computer system. For example, reducing the number of images can reduce the network bandwidth for transmitting data for classification. In addition, the reduction in the number of images can reduce the computing resources that are required by the computing device that captured the image for classification, and the remote computer system that is implementing the machine learning model that classifies the images.

The techniques can improve the functioning of a computer system by automatically initiating a communication channel in response to evaluating an image. The image may be provided to a machine learning model and the model may output a confidence score and a quantity that corresponds to the media of exchange that is depicted in the image. The quantity and confidence score can be compared to evaluation criteria, and based on the comparison, the remote computer system can call an application programming interface for an external service to retrieve an address for a communication channel. This address can be automatically provided to the computer system that captured the image.

The computer system can use the address to initiate the call by taking one or more preparatory actions for establishing the communication channel. For example, the computer system may use the address to establish contact with the computing device associated with the address, and the computing systems involved in the communication channel can begin an authentication procedure. The preparatory actions may include a key exchange, and the authentication procedure may include mutual authentication using these keys (e.g., Diffee-Helman encryption).

In addition or alternatively, the preparatory actions may include verifying that the address is associated with a device that is ready to participate in a communication channel. The external service may be a service that connects visually impaired individuals with volunteers who can assist the individual, and the preparatory actions can include verifying that a volunteer is available to assist the visually impaired individual. For example, a text message may be sent to the address, and a response to the message may be used to determine if the volunteer is available to participate in the call These preparatory actions can improve the functioning of a computer system because a connection over the communication channel can be performed more rapidly than would be possible without the preparatory actions.

The techniques can include automatically labeling an image to generate training data. An image may be received from a computer system that is associated with a repository organization account (e.g., a bank account). In some embodiments, a change in the account balance can be used to determine a label for an image. For example, an image that is captured within a threshold time period of a change in the account balance can be labeled with the change. The labeled image can be used to train, or retrain, a machine learning model, and the model may be automatically retrained after a threshold amount of new training data is available. In some embodiments, the original image may be reclassified by the model after the model has been retrained.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates an example flow 100 for object identification in accordance with at least one embodiment. The operations discussed in connection with FIG. 1 may be performed with any combination of a user device 102 and a System 104. In some embodiments, any combination of user device 102 and System 102 may be implemented by one or more computer(s), as a service, within an application, or the like. The operations discussed in connection with FIG. 1 may be performed in any suitable order. More or fewer operations than those depicted in FIG. 1 may be employed without diverting from this disclosure.

The flow 100 may begin at 103, and user device 102 can capture an image. The image can include a representation of a medium of exchange 106 that is captured by a camera of the user device 102. The medium of exchange can include multiple notes or coins of a currency. In some embodiments, the medium of exchange 106 can include notes or coins from multiple currencies. Each note or coin for a currency can represent a quantity of the currency.

At 105, the image can be communicated from the user device 102 to the image system 104. The image of the medium of exchange 104 can be communicated to the image system 104 over a network (e.g., the Internet). The user device 102 may compare the image captured at 103 against one or more criteria to determine whether to communicate the image to the image system 104. The image may be communicated with instructions that specify a desired currency and an expected quantity. The expected quantity can be provided via the user device 102, and for example, a user can provide the expected quantity through a graphical user interface or through oral commands to the device (e.g., an audio interface). In some embodiments, the expected quantity can be provided by a repository organization (e.g., a bank). For example, the user of the user device may make a withdrawal from an account that is maintained by the repository organization, and the withdrawal amount may be the expected quantity.

At 107, the user device 102 may receive a quantity and an evaluation score for the image that was communicated at 105. The image system 104 may generate the quantity and evaluation score by inputting the image from 105 into a machine-learning model. In some embodiments, the image system 104 may create a feature vector for the image, and the feature vector can be input to the machine learning model. The quantity can be a value of the medium of exchange from the image, and in some embodiments, the image system 104 may identify currencies that correspond to the medium of exchange. The image system 104 may return the quantity in the desired currency from 105. For example, the desired currency may be United States dollars, and the image system 104 may determine a dollar value that corresponds to the medium of exchange in the image. The confidence score can be a probability between 0 and 1 in some embodiments.

At 109, the quantity and confidence score can be compared to one or more evaluation criteria. The evaluation criteria can include one or more confidence score thresholds in some embodiments. The evaluation criteria may include thresholds for maximum or minimum quantities. In some embodiments, the evaluation criteria may include the expected quantity from 103. In such embodiments, the quantity can be compared to the expected quantity. In some embodiments, the expected quantity and the image can be used to generate labeled training data for training a machine learning model to determine an amount of currency in an image. The image, or image information corresponding to the image, can be input to a model during training. The model being trained can output a predicted amount that is compared to the expected quantity. The model parameters can be iteratively updated until the predicted amount corresponds to the expected quantity.

At 111, the user device 102 may present an option for establishing a communication channel. The communication channel can be a call to an individual who can verify that the quantity returned by the image system 104 is accurate. For example, the user device 102 can determine, based on the comparison at 109, that the device should present an option to establish the communication channel because there is reason to doubt the accuracy of the quantity returned by the image system 104. The user device 102 can present the option via a graphical user interface, via an audio interface, or both a graphical user interface and an audio interface.

At block 113, the user device 102 can establish the communication channel with one or more user device(s) 108. The user devices 108 can be associated with one or more users 110, and after the communication channel is established, a user 110 can verify the quantity that corresponds to the image. The communication channel can be an audio communication channel, a video communication channel, or an audiovisual communication channel. Establishing the communication channel can include providing the image from 103 from the user device 102 to the user devices 108. In some embodiments, the communication channel can be a text-based thread (e.g., a chat channel). In some embodiments, the quantity provided via the communication channel can be used to label training data.

Figure 2:
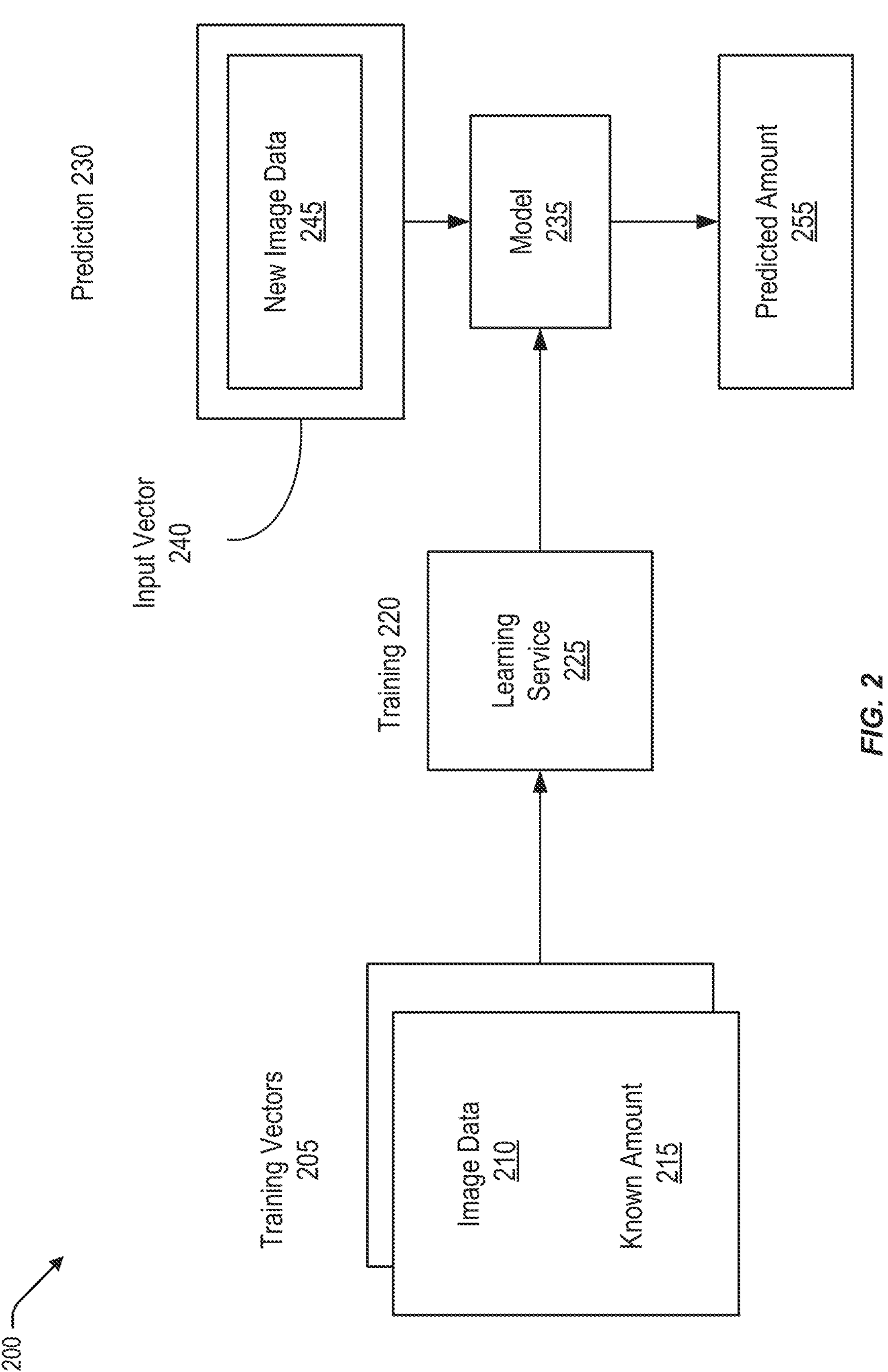
FIG. 2 shows a technique for training a machine learning model according to at least one embodiment.

FIG. 2 depicts an architecture for training a machine learning model according to the embodiments of the present disclosure. This architecture can be part of the model system 104 described above with respect to FIG. 1. The machine learning model can be trained to classify image data (e.g., an image) as corresponding to a particular amount of a medium of exchange as described above in step 107. Training vectors 205 are shown with image data 210 and a known cluster assignment 215. Image data 210 can include any information about an image as described herein. For ease of illustration, only two training vectors are shown, but the number of training vectors may be much larger, e.g., 10, 20, 100, 1,000, 10,000, 100,000, or more. Training vectors (e.g., feature vectors) could be made for any combination of different image data over the same time period, the same image data over different time periods.

Image data 210 has property fields that can correspond to the image data received at the image system (e.g., image system 400) during a time period and the skilled person will appreciate the various ways that such data can be configured. Known amount assignment 215 includes the amount of a medium of exchange (e.g., information identifying the quantity of currency that is depicted in the image data 210). The known assignment 215 can include a currency type (e.g., dollars, pesos, yen, yuan, euros, etc.).

Training vectors 205 can be used by a learning service 225 to perform training 220. A service, such as learning service 225, is one or more computing devices configured to execute computer code to perform one or more operations that make up the service. Learning service 225 can optimize the parameters of model 235 such that a quality metric (e.g., the accuracy of model 235) is achieved with one or more specified criteria. The accuracy may be measured by comparing known amount(s) 215 to the predicted amount(s) 255. Parameters of model 235 can be iteratively varied to increase accuracy. Determining a quality metric can be implemented for any arbitrary function including the set of all risk, loss, utility, and decision functions.

In some embodiments of training, a gradient may be determined for how varying the parameters affects a cost function, which can provide a measure of how accurate the current state of the machine learning model is. The gradient can be used in conjunction with a learning step (e.g., a measure of how much the parameters of the model should be updated for a given time step of the optimization process). The parameters (which can include weights, matrix transformations, and probability distributions) can thus be optimized to provide an optimal value of the cost function, which can be measured as being above or below a threshold (i.e., exceeds a threshold) or the cost function does not change significantly for several time steps, as examples. In other embodiments, training can be implemented with methods that do not require a hessian or gradient calculation, such as dynamic programming or evolutionary algorithms.

A prediction stage 230 can provide a predicted amount of 255 for a new image's image input vector 240 based on new image data 245. The predicted amount 255 can be an amount of currency that is depicted in the image data that corresponds to the input vector 240. The new image data 245 can be of a similar type as image data 210. If new image data 245 values are of a different type, a transformation can be performed on the data to obtain data in a similar format as image data 210. Ideally, the predicted amount 255 corresponds to the true amount of currency for input vector 240.

A "machine learning model" (ML model) can refer to a software engine configured to be run on one or more processors to provide a classification or numerical value of a property of one or more samples. An ML model can be generated using sample data (e.g., training data) to make predictions on test data. One example is an unsupervised learning model. Another example type of model is supervised learning which can be used with embodiments of the present disclosure. Example supervised learning models may include different approaches and algorithms including analytical learning, statistical models, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, nearest neighbor algorithm, probably approximately correct learning (PAC) learning, ripple down rules, a knowledge acquisition methodology, symbolic machine learning algorithms, sub-symbolic machine learning algorithms, minimum complexity machines (MCM), random forests, ensembles of classifiers, ordinal classification, data pre-processing, handling imbalanced datasets, statistical relational learning, or Proaftn, a multicriteria classification algorithm. The model may include linear regression, logistic regression, deep recurrent neural network (e.g., long short-term memory, LSTM), hidden Markov model (HMM), linear discriminant analysis (LDA), k-means clustering, density-based spatial clustering of applications with noise (DBSCAN), random forest algorithm, support vector machine (SVM), or any model described herein. Supervised learning models can be trained in various ways using various cost/loss functions that define the error from the known label (e.g., least squares and absolute difference from known classification) and various optimization techniques, e.g., using backpropagation, steepest descent, conjugate gradient, and Newton and quasi-Newton techniques.

Examples of machine learning models include deep learning models, neural networks (e.g., deep learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks can employ wide and tensorized deep architectures, convolutional layers, dropout, various neural activations, and regularization steps.

Figure 3:
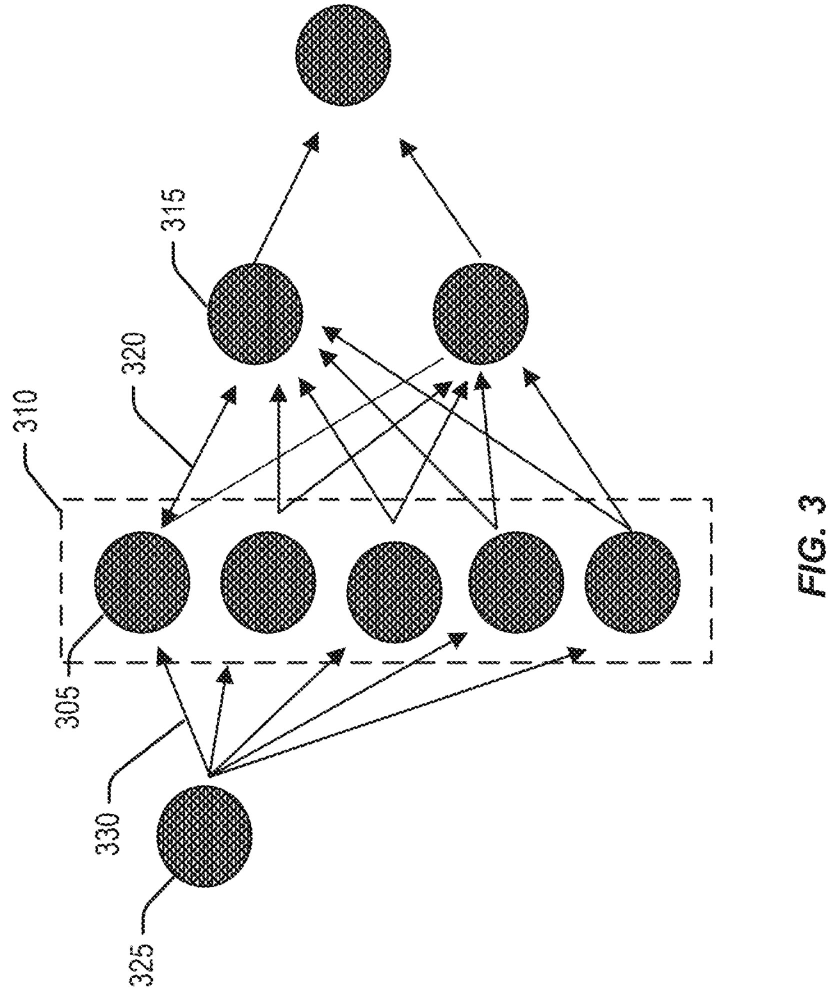
FIG. 3 shows an example machine learning model of a neural network according to at least one embodiment.

FIG. 3 shows an example machine learning model of a neural network, according to at least one embodiment. As an example, model 335 can be a neural network that includes a number of neurons (e.g., Adaptive basis functions) organized in layers. Model 335 can be an example of a machine learning model that can be trained using Architecture 200. For example, neuron 305 can be part of layer 310. The neurons can be connected by edges between neurons. For example, neuron 305 can be connected to neuron 315 by edge 320. A neuron can be connected to any number of different neurons in any number of layers. For instance, neuron 305 can be connected to neuron 325 by edge 330 in addition to being connected to neuron 315.

The training of the neural network can iteratively search for the best configuration of the parameter of the neural network for feature recognition and prediction performance. Various numbers of layers and nodes may be used. A person with skills in the art can easily recognize variations in a neural network design and design of other machine learning models. For example, neural networks can include graph neural networks that are configured to operate on unstructured data. A graph neural network can receive a graph (e.g., nodes connected by edges) as an input to the model and the graph neural network can learn the features of this input through pairwise message passing. In pairwise message passing, nodes exchange information, and each node iteratively updates its representation based on the passed information.

Figure 4:
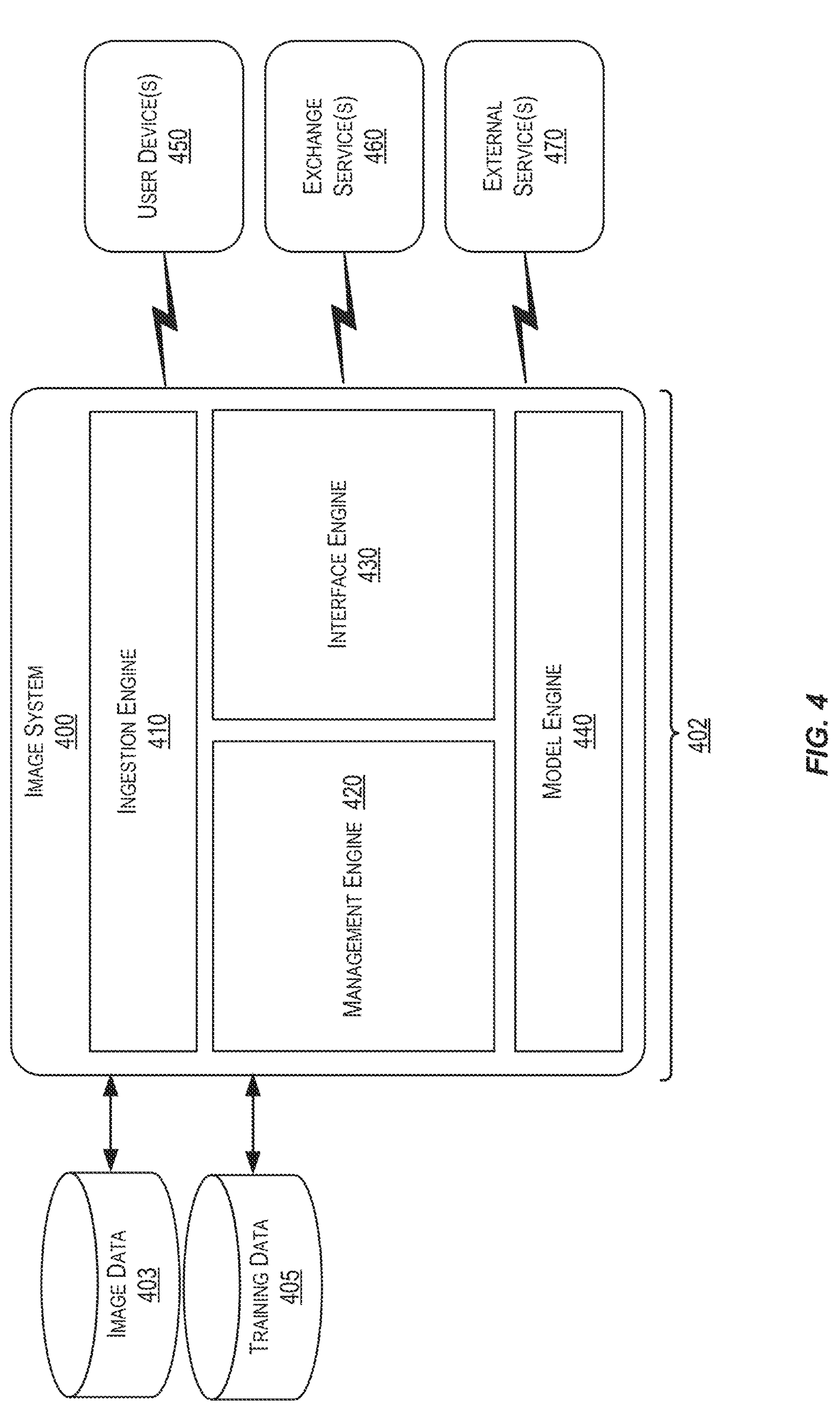
FIG. 4 is a schematic diagram of an example computer architecture for the image system, including a plurality of engines that may perform functions in accordance with at least one embodiment.

FIG. 4 is a schematic diagram of an example computer architecture for the image system 400, including a plurality of engines 402 that may perform functions in accordance with at least one embodiment. The plurality of engines 402 can include any combination of any number of an ingestion engine 410, a management engine 420, an interface engine 430, and a model engine 440. The engines 402 may be software engines, hardware engines, or a combination thereof. If the engines are software engines, the engines can be embodied on a computer-readable medium and processed by a processor in any of the computer systems described herein. It should be noted that any engine or data store described herein, may be, in some embodiments, a service responsible for providing functionality corresponding to the engine described below. The engines 402 may be executed as part of the image system 400, or the engines 402 may exist as separate engines or services external to the image system 400. Image system 400 is an example of the image system 102. In some embodiments, the engines 402 may be executed by the same or different computing devices, as a service, as an application, or the like.

In the embodiment shown in FIG. 4, data stores such as image data 403 and training data 405 are shown, although data can be maintained, derived, or otherwise accessed from various data stores, either remote or local to the image system 400, to achieve the functions described herein. The image system 400, as shown in FIG. 4, includes various engines such as an ingestion engine 410, a management engine 420, an interface engine 430, and a model engine 440. The Record System can communicate information to and from user device(s) 450, exchange service(s) 460, and/or External System(s) 470. Some functions of the engines 410-440 and systems 450-470 are described below. However, for the benefit of the reader, a brief, non-limiting description of each of the engines and systems is provided in the following paragraphs. In accordance with at least one embodiment, a process for filtering and communicating entity record data is provided.

In at least one embodiment, the image system 400 includes the ingestion engine 410. Generally, the ingestion engine 410 may be utilized to receive any suitable information with respect to any example provided herein. By way of example, the ingestion engine 410 may be configured to receive images or image information (e.g., image data). The image data may be received from one or more user devices 450. If necessary, the image data may be stored as image data 403 and accessed by the ingestion engine 410. The image data 403 can include an expected quantity that is associated with the image (e.g., an expected value of the currency that corresponds to the image data). In some embodiments, the image data 403 can include information that identifies one or more currencies that are associated with the image (e.g., one or more currency types with notes or coins that are depicted in the image).

The ingestion engine 410 may ingest the entity data by cleaning, processing, or otherwise transforming the image data 403, and the ingestion engine 410 can use the ingested entity data to update or create new training data 405. Ingesting the image data 403 can include removing duplicate data, changing data from one format to another (e.g., changing an image file type), correcting corrupted data entries, removing unnecessary data, or otherwise making the image data 403 suitable for use by the other engines 402.

In at least one embodiment, the image system 400 includes the management engine 420. Generally, the management engine 420 may be utilized to organize and associate the image data 403 and training data 405. For example, the management engine 420 can use the image data 403 to create or update (e.g., change) the training data 405, and the management engine 420 can sort the training data into sets or subsets of training data based on any applicable criteria. For example, the management engine can create sets of training data for different currency types, different currency amounts, or different image properties (e.g., different image brightness). The sets or subsets of training data can be stored as training data 405.

In at least one embodiment, the image system 400 includes the interface engine 430. Generally, the interface engine 430 may be utilized to generate graphical user interfaces, provide the graphical user interfaces to client devices (e.g., to client software or in a browser), provide output to the graphical user interfaces, and receive input from the graphical user interfaces. The interface engine 430 can be used to generate audio interfaces in some embodiments. The audio interface may perform any of the functions of a graphical user interface described herein. The interface engine 430 can be used to provide notifications to one or more client devices and to generally perform one or more operations with respect to the event data in image system 400. The interface engine can communicate with systems outside the image system 400.

A graphical user interface can be generated to display a quantity of media of exchange that corresponds to an image. For example, the interface engine 430 can receive a request from a user. The request can be a request for a quantity of media of exchange that is displayed in an image, and the request can include any combination of an image or image information that corresponds to the image. The interface engine 430 can provide the information in the request to the management engine 420, and the management engine can process the image in response to the request.

An audio interface can provide output via speakers and receive input via microphones. An audio interface and a graphical user interface can be presented concurrently, and for example, a speaker can play a description of each element in the graphical user interface as a user navigates through the graphical user interface. In a concurrent audio and graphical user interface, input can be provided as audio or by selecting elements within the interface.

In at least one embodiment, the image system 400 can include a model engine 440. The model engine 440 can be used to implement a machine learning model including the machine learning model that is described with reference to FIG. 3. The model engine 440 can provide input to a machine learning model and receive output from the model. In addition, the model engine 440 can include the architecture for training a machine learning model that is described with reference to FIG. 2. Generally, the model engine 440 can be used to compare image data 403 to one or more rules, to train a machine learning model, or to use a machine learning model to classify image data (e.g., to classify the image as including a quantity of a media of exchange). For example, the model engine 440 can request and receive any combination of images and image information for classification from the management engine 420 via the interface engine 430.

The model engine 440 can quantity classified with one or more machine learning models. A feature vector can be generated for each image. For example, the feature vector for an image can include numeric representations of any combination of information about the image. For example, the feature vector can include information about the color for some or all of the pixels in the image (e.g., the red, green, and blue value for each pixel), average colors for groups of pixels (e.g., the mean, median, or mode for the red, green, and blue value for a group of pixels), color distribution for groups of pixels (e.g., a standard deviation or a histogram for the red, green, and blue value for a group of pixels). As described above, the feature vectors can be used to train a machine learning model or to receive a classification (e.g., a quantity of a media of exchange) for the image represented by the feature vector.

In at least one embodiment, the image system 400 can communicate with user device(s) 450. For example, a user device 450 can be user device 102 or user device(s) 108. Communication between image system 400 and the user device(s) 450 can occur via the interface engine 430. For example, image data can be received from the user device(s) 450 via the interface engine 430.

In at least one embodiment, the image system 400 can communicate with exchange service(s) 450. For example, an exchange service 460 can be a service that publishes exchange rates between two or more currencies. The exchange service(s) 460 can be used to determine total amount of a media of exchange that is displayed in an image when multiple currencies are depicted in the image. For example, an image may show a mix of dollars and pesos, and the exchange service can determine a total value in dollars, pesos, or a third currency that corresponds to the image. The desired currency for an image can be received via a user interface, and the image system 400 can use the exchange service 460 to determine a value in the desired currency that corresponds to the media of exchange in an image.

In at least one embodiment, the image system 400 can communicate with external service(s) 470. For example, an external service 470 can be a service that provides remote assistance to visually impaired individuals. For example, the service can establish a video call, phone call, or text thread with a volunteer who can help answer questions about image data 403. The image system 400 can call an application programming interface of an external service 470 to establish communication between the user device that captured image data 403 and a user device from the external service (e.g., a user device of a volunteer). The call to the application programming interface can include requesting an address of a user device or providing an address of a user device.

Figure 5:
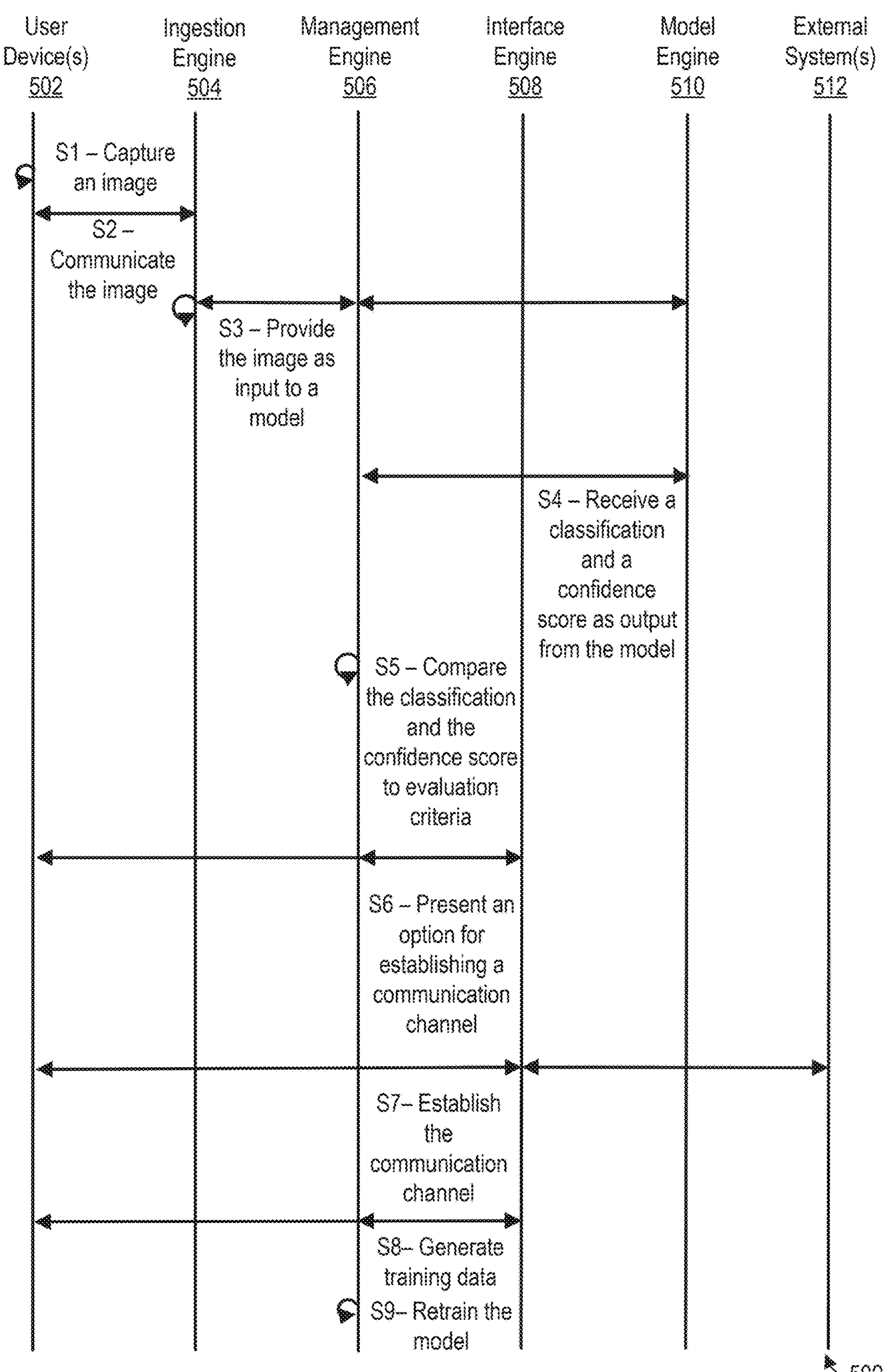
FIG. 5 is a sequence diagram showing a technique for object identification according to at least one embodiment.

FIG. 5 is a sequence diagram 500 showing a technique for object identification according to various embodiments. At S1, a user device 502 can capture an image, and for example, the image may be captured by a camera of the user device. In some embodiments, the image may be accessed from the memory of the user device 502. In some embodiments, the image can be captured via a graphical user interface that is provided to the user device 502 by an interface engine 508.

At S2, the image from S1 can be communicated from the user device 502 to an ingestion engine 504. The image can be communicated over a network. In some embodiments, information about the image can be communicated in addition, or as an alternative to, the image. The information can include an estimated number of notes or coins of the media of exchange that are depicted in the image. The information can include an estimated quantity for the media of exchange that are depicted in the image.

At S3, the image can be provided as input to the model. In some embodiments, information about the image can be provided to the model in addition to, or as an alternative to, the image. Providing the image as input to the model can mean that the ingestion engine 504 provides the image, and/or the image information, to a model engine 510 that includes the machine learning model. In some embodiments, the image may be provided to the model engine 510 via the management engine 506. The management engine 506 may generate a feature vector using the image and/or image information, and the feature vector may be provided to the model engine 510.

At S4, a classification and a confidence score can be received as output from the machine learning model. The classification and the confidence score can be received at the management engine 506 and from the model engine 510. The classification can be a quantity that represents the media of exchange that is depicted in the image from S1. The classification can be multiple classifications, and for example, the classification may include a quantity for each currency type depicted in the image (e.g., a first quantity for the number of pesos shown in an image, a second quantity for the number of euros shown in the image).

At S5, the classification and the confidence score can be compared to evaluation criteria. The comparison to the evaluation criteria may be used to determine whether to present an option for establishing a communication channel. The option may be presented in response to the confidence score failing to satisfy the evaluation criteria. For example, an option may be presented if the comparison to the evaluation criteria suggests that the classification is likely to be inaccurate.

At S6, an option for presenting a communication channel can be presented. Presenting the option may include instructing the interface engine to communicate one or more of a graphical interface and an audio interface to the user device 502, and the option can be presented via one or more interfaces. A response to the option can be received via one or more interfaces in some embodiments.

At S7, the communication channel can be established. The communication channel may be established in response to input to a graphical interface or audio interface that is executing on the user device 502. The input can select the option to establish the communication channel. The communication channel can be established by calling an application programming interface of an external service 512. The external service 512 can return an address for a user device that is associated with the external service, and the user device 502 can use the address to establish a communication channel.

At S8, training data can be generated. Training data can be an image, and/or image data, and a label. The label for an image can be an amount of the media of exchange that is depicted in the image. The label can be provided via the communication channel, and the interface engine 508 can detect the label by monitoring the communication channel. The management engine 506 can store the image, any image information, and the label as training data. In some embodiments, the label can be generated by monitoring an account from an external service that is associated with the user device 502. For example, the external service may detect a change in the balance of the account that is associated with the user device. If the image information indicates that the image was captured within a threshold amount of time of the change in balance, the management engine 506 may assign a label to the image that is based on the change in account balance (e.g., a $400 label is assigned to the image if the image was captured within 15 minutes of a $ 400 withdrawal).

At S9, the model can be retrained using the training data. Retraining the model can include any of the training techniques disclosed herein including the techniques described with reference to FIG. 2. The machine learning model may be retrained until the model satisfies an accuracy score (e.g., an R-squared value). After the model is retrained, the machine learning model can be used to perform any of the operations of S3-S8.

Figure 6:
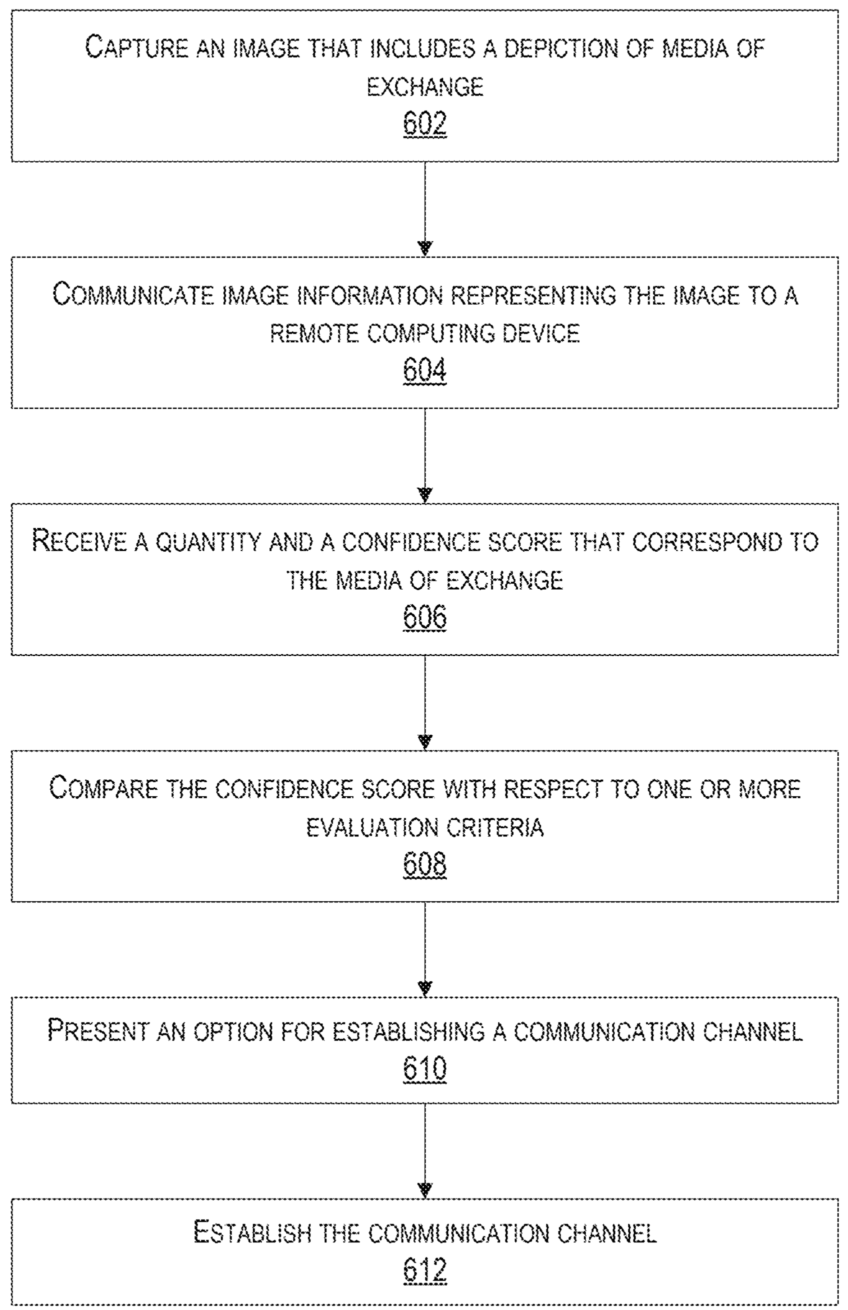
FIG. 6 is a block diagram illustrating an example method for object identification, in accordance with at least one embodiment.

FIG. 6 is a block diagram illustrating an example method 600 for object identification, in accordance with at least one embodiment. A non-transitory computer-readable storage medium may store computer-executable instructions that, when executed by at least one processor, cause at least one computer to perform instructions comprising the operations of the method 600. It should be appreciated that the operations of the method 600 may be performed in any suitable order, not necessarily the order depicted in FIG. 6. Further, the method 600 may include additional, or fewer operations than those depicted in FIG. 6. The operations of method 600 may be performed by any suitable portion the Image System 104 of FIG. 1. In some embodiments, method 600 may be executed by components of image system 400 of FIG. 4. In some embodiments, method 600 may be executed by components of Computing Device 800 of FIG. 8.

At block 602, an image can be captured. The image can be captured by a camera of a mobile device (e.g., a user device), and the image can include a depiction of media of exchange. The media of exchange can include two or more legal tenders. Each of the two or more legal tenders can be a coin or a banknote (e.g., notes). A first portion of a first legal tender in the image may overlap with a second portion of a second legal tender in the image. The legal tender in the image may come from two or more currencies (e.g., a system of money that is in use within a geographic region).

At block 604, image information representing the image can be communicated to a remote computing device. The information representing the image can be a feature vector that is generated by the mobile device. The remote computing device can be any type of computing device such as a server computer, and the remote computing device can be configured to execute a machine learning model. The machine learning model can receive the image information as input and output a quantity that corresponds to the media of exchange that is depicted in the image.

The image information can include a number of the media of exchange that are expected to be depicted in the image. For example, the mobile device may present an option for receiving a number of coins or bills in the image. The mobile device can perform object recognition techniques in conjunction with using the number of media of exchange, and for example, the mobile device may determine whether the number of objects recognized in the image (e.g., using object recognition techniques) matches the number of coins or bills that were provided to the mobile device. This technique can reduce the likelihood that a second image is communicated to the remote computing device because the first image does not depict all of the media of exchange. In some embodiments, the number of media of exchange and object recognition techniques can be used to capture the image. For example, the mobile device may monitor input from the camera, and the mobile device may capture the image (e.g., the image from block 602) upon detecting a number of objects that match the number of media of exchange that are expected to be in the image.

At block 606, a quantity and a confidence score can be received from the remote computing device. The quantity and the confidence score can correspond to the media of exchange. In some embodiments, the quantity can be a total sum that corresponds to the media of exchange (e.g., $100), an itemized sum that identifies each individual medium of exchange (e.g., three $20 bills, one $10 bill, and six $5 bills), or both. The confidence score can be a probability (e.g., between 0 and 1) that the quantity corresponds to the media of exchange. In some embodiments, a confidence score can be assigned to each medium of exchange.

At block 608, the confidence score can be compared with respect to one or more evaluation criteria. For example, the confidence score can be compared with one or more thresholds. The evaluation criteria can include some or all of the image information from 604. For example, the remote computing device can provide a number of identified objects, and this number can be compared to the number of media of exchange that are expected to be depicted in the image from 604.

At block 610, an option for establishing a communication channel can be presented. For example, the option can be presented via a graphical user interface that is displayed on a display of the mobile device. In some embodiments, the option can be presented via an audio interface. In an audio interface, the mobile device can present the option as output from the mobile device's speaker (e.g., "would you like to establish a communication channel). Input to the audio interface can be received via the mobile device's microphone. The option for establishing the communication channel may be presented based at least in part on the comparison at 608.

At block 612, a communication channel can be established. The communication channel can be established between the mobile device from 602 (e.g., a first mobile device) and a second mobile device. In some embodiments, an address for the second mobile device can be accessed from a contacts list on the first mobile device. For example, the graphical user interface or audio interface from 610 may present an option for selecting a contact for the communication channel. The contacts list may be stored in the memory of the mobile device, and the contacts list may include a preferred contact. If the contact list includes a preferred contact, the communication channel may be established without prompting a user of the first mobile device to identify a specific contact.

In some embodiments, the address for the second mobile device be retrieved from an external service, and establishing the communication channel can include requesting the address from an application programming interface of the external service. The communication channel can be a phone call (e.g., an audio call), a video call, a text thread, or any other communication channel, and the communication channel can be established over a network such as the internet or a public switched telephone network. The address can be a phone number, an email address, or an internet protocol address. Establishing the communication channel can include providing any combination of the image from 602 and the image information from 604.

Figure 7:
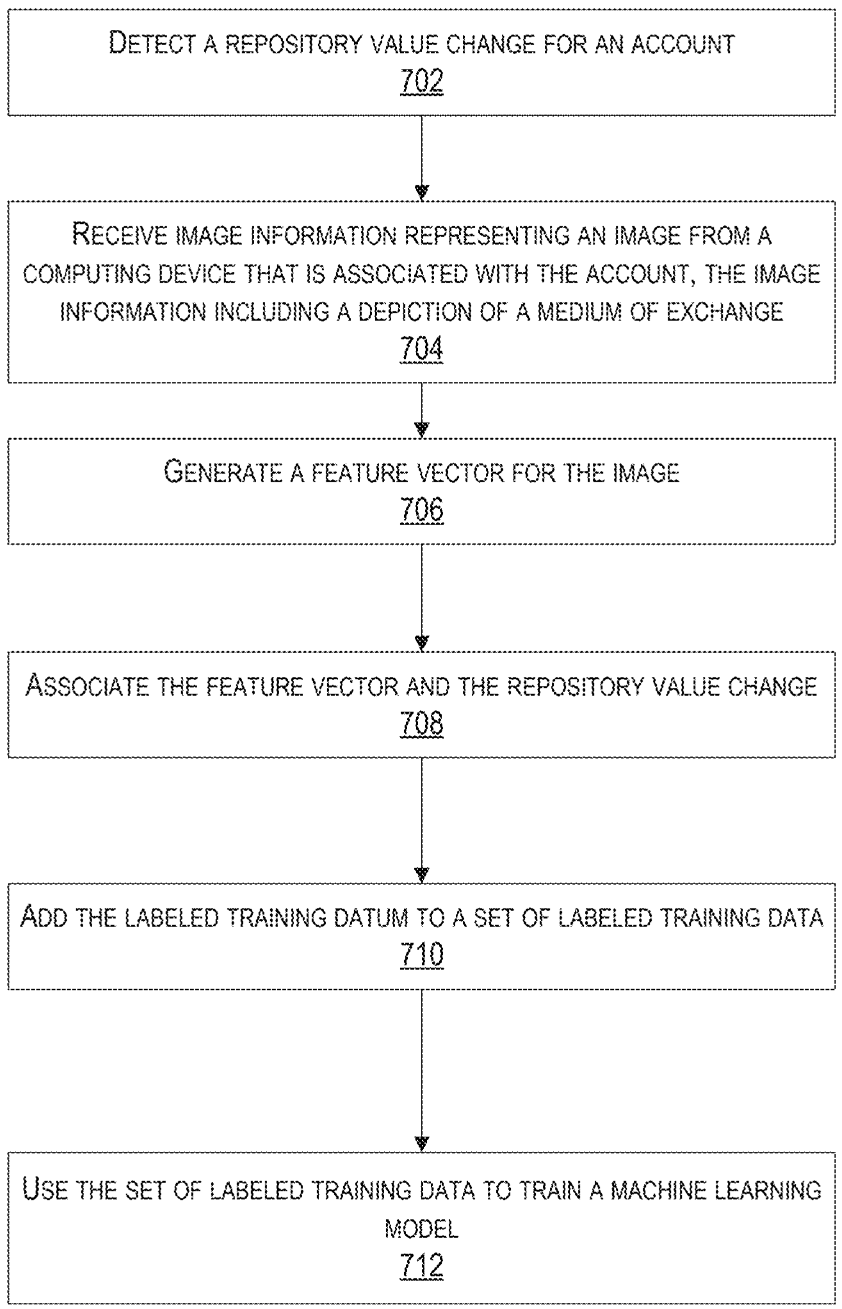
FIG. 7 is a block diagram illustrating an example method for generating training data, in accordance with at least one embodiment.

FIG. 7 is a block diagram illustrating an example method 700 for generating training data in accordance with at least one embodiment. A non-transitory computer-readable storage medium may store computer-executable instructions that, when executed by at least one processor, cause at least one computer to perform instructions comprising the operations of the method 700. It should be appreciated that the operations of the method 700 may be performed in any suitable order, not necessarily the order depicted in FIG. 7. Further, the method 700 may include additional, or fewer operations than those depicted in FIG. 7. The operations of method 700 may be performed by any suitable portion the image system 102 of FIG. 1. In some embodiments, method 700 may be executed by components of image system 400 of FIG. 4. In some embodiments, method 700 may be executed by components of Computing Device 800 of FIG. 8.

At block 702, a repository change can be detected for an account. The account can be a bank account, and the repository change can be a deposit or a withdrawal. The change can be detected in response to a communication from a branch or an automated teller machine that is associated with a repository organization (e.g., a bank). There may be tens of thousands or hundreds of thousands of bank branches and automatic teller machines that are managed by the repository organization, and the repository organization may have hundreds of thousands or millions of account holders. A computer system implementing these techniques may receive the request for the repository value change from an automated teller machine, and the machine may dispense a quantity of media of exchange that corresponds to the repository value change.

At block 704, image information representing an image from a computing device can be received. The computing device can be a user device, a mobile device, a tablet device, or a smartphone in various embodiments. The computing device can be associated with the account from 702. The image information representing the image can include any combination of an image file and information identifying the account from block 702. The change in account can be a deposit or withdrawal. For example, an individual may take a photo after a withdrawal of media of exchange or the photo may be taken before a deposit of media of exchange.

At block 706, a feature vector for the image can be generated. The feature vector can be generated using the image information from block 704, and the feature vector can be an ordered list of numeric properties of the image. For example, some or all of the pixels in the image can be represented in the feature vector as a series of numbers. The numbers that represent the color properties of a pixel can include a red value indicating the intensity of the red component of the pixel's color, a blue value representing the intensity of the blue component of the pixel's color, and a yellow component representing the intensity of the yellow component of the pixel's color. The feature vector can include statistics summarizing the color properties for groups of pixels (e.g., a mean, a median, a mode, and a standard deviation of the yellow value for a group of pixels).

At block 708, the feature vector and the repository value change can be associated with creating labeled training data. The image information may identify an account, and a computer system implementing these techniques may use the account to identify a change in the account balance. The computer system may compare timestamps for the change in the account balance (e.g., a change time) and a timestamp from the image information to associate the image and change. For example, the feature vector may be labeled with the change in account balance if the time period between the timestamps is within a threshold amount of time. The threshold can be 1 minute, 5 minutes, 15 minutes, 30 minutes, 1 hour, 2 hours, 6 hours, 12 hours, or 24 hours.

At block 710, the labeled training data can be added to a set of labeled training data. Adding the labeled training data to a set of labeled training data can include storing the labeled training data in a database.

At block 712, the set of labeled training data can be used to train a machine learning model. The machine learning model can be configured to receive image information as input, and in response, the model can output a quantity that corresponds to the medium of exchange depicted in the image. Training the model can include iteratively changing model parameters until the model is able to accurately classify the training data (e.g., the output label matches the label for the training data). The model may be trained on tens of thousands or hundreds of thousands of datum of training data, and the model's accuracy can be determined by an accuracy score (e.g., an R-squared value). The model may accurately classify the training data if the accuracy score exceeds an accuracy score threshold.

To train the machine learning model, feature vectors corresponding to the labeled training data can be input into the machine learning model. A predicted repository value change and a confidence score can be output from the machine learning model. The confidence score can comprise a probability that the media of exchange in the image corresponds to the predicted repository value change that is output by the model. At each round of training, the repository value change, the predicted repository value change, and the confidence score can be compared, and the parameters of the model can be updated based on this comparison.

The machine learning model may be used to classify images after training. The computer system implementing these techniques may receive a second image from a computing device associated with the account (e.g., a second computing device), and the system may generate a feature vector for the second image. The feature vector may be input to the machine learning model, and a second predicted repository value change can be output by the model. The predicted change in repository value can be provided to the computing device associated with the account and the predicted change in repository value can be presented via a graphical user interface or an audio interface.

Figure 8:
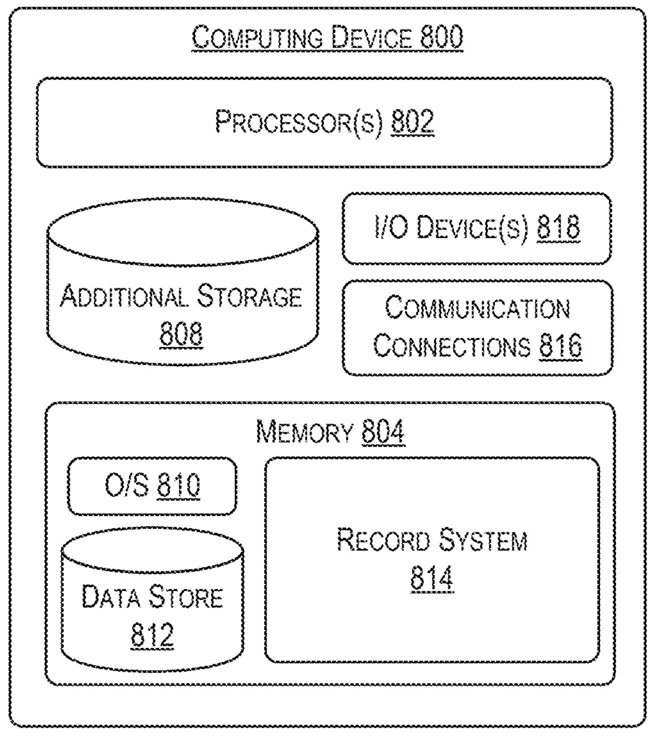
FIG. 8 illustrates an example computing device that may implement the methods disclosed herein.

FIG. 8 illustrates an example computing device 800 that may implement the methods disclosed herein. In some embodiments, the computing device 800 may include one or more processors (e.g., processor(s) 802). The processor(s) 802 may be implemented in hardware, computer-executable instructions, firmware, or combinations thereof. Computer-executable instruction or firmware implementations of the processor(s) 802 may include computer-executable or machine-executable instructions written in any suitable programming language.

Computing device 800 may include memory 804. The memory 804 may store computer-executable instructions that are loadable and executable by the processor(s) 802, as well as data generated during the execution of these programs. The memory 804 may be volatile (such as RAM) and/or non-volatile (such as ROM, flash memory, etc.). The computing device 800 may include additional storage 806, which may include removable storage and/or non-removable storage. The additional storage 806 may include but is not limited to, magnetic storage, optical disks, and/or tape storage. The disk drives and their associated computer-readable media may provide non-volatile storage of computer-readable instructions, data structures, program engines, and other data for the computing devices. In some implementations, the memory 804 or additional storage 806 may individually, or collectively, include multiple different types of memory, such as SRAM, DRAM, or ROM.

The memory 804 and/or additional storage 808 may be examples of computer-readable storage media. Computer-readable storage media may include volatile, non-volatile, removable, or non-removable media implemented in any method or technology for storage of information such as computer-readable instructions, data structures, program engines, or other data. In some embodiments, memory 804 and the additional storage 808 are examples of computer storage media. Memory 804 and/or additional storage 808 may include but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 800. Combinations of any of the above should also be included within the scope of computer-readable media. Computer-readable media may include computer-readable instructions, program engines, or other data transmitted within a data signal, such as a carrier wave, or other transmission. However, as used herein, computer-readable storage media does not include computer-readable communication media.

The memory 804 may include an operating system 808 and one or more data stores 810, and/or one or more application programs, engines, or services for implementing the features disclosed herein, such as the features provided by the image system 814 (an example of the image system 400 of FIG. 4).

The computing device may also contain communications connection(s) 816 that allow the computing device 800 to communicate with a stored database, another computing device, a server, user terminals, and/or other devices (e.g., via one or more networks, not depicted). The computing device may also include I/O device(s) 818, such as a keyboard, a mouse, a pen, a voice input device, a touch input device, a display, speakers, a printer, etc.

Object identification techniques can be used to count money for a visually impaired individual. These individuals may depend on others to count physical bills or coins, and this dependence can mean that visually impaired individuals are susceptible to exploitation. For example, a sales clerk may steal from a visually impaired individual by lying about the amount of money that the salesperson is handing to the individual. In addition, it may be difficult for a visually impaired individual to conceal that they have a large amount of money if the individual has to rely on another person to count their cash.

Instead of relying on others, a visually impaired individual may use a mobile device, or other computing device, to capture their cash. The image can be transmitted to a service that can perform object identification techniques to determine the number and type of bills in the image. The image can be input to a machine learning model and the model can output the amount of money in the image and a confidence score. The system may compare the output against evaluation criteria to determine if the output is reliable. If the output is not reliable, the system can cause an application executing on the mobile device to present an option to make a call to a trusted party. This trusted party may be a contact, or a volunteer at a service such as Be My Eyes, and the party can manually count the money for the visually impaired individual. The trusted party may be more reliable because they are remote from the visually impaired individual and they may not have an opportunity to benefit from lying about the amount of money.

These techniques can be used to generate training data for a machine learning model. The visually impaired individual may capture an image before depositing cash to a bank account, or after a withdrawal from the bank account. The system implementing the machine learning model may have access to the account change information, and training data can be automatically generated by assigning the account change as a label for the image. In addition, the label may be assigned during a call to the trusted party. For example, the image capture techniques, and the call to a trusted party, may occur via a phone application. The application's graphical user interface may present an option for the trusted party to provide the amount of money in the image. This amount of money can be assigned as a label for the image.

The various embodiments further can be implemented in a wide variety of operating environments, which in some cases can include one or more user computers, computing devices, or processing devices that can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art of supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flashcards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, engines, services, or other elements located within at least one working memory device, including an operating system and application programs, such as a client application or Web browser. It should be appreciated that alternate embodiments may have numerous variations from that described above. For example, customized hardware might also be used, and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program engines, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein is merely intended to serve as a shorthand method of referring individually to each separate value falling within the range unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:

receiving, by a remote computing device and from a mobile device, image information representing an image that includes a depiction of a media of exchange;

providing, by the remote computing device, the image information as input to a machine learning model implemented by the remote computing device;

receiving, by the remote computing device and from the machine learning model, an output comprising a classification and a confidence score, the classification comprising a quantity that corresponds to the media of exchange, the confidence score comprising a probability that the media of exchange in the image corresponds to the quantity;

comparing, by the remote computing device, the confidence score with respect to one or more evaluation criteria; and in response to determining that the confidence score does not satisfy the one or more evaluation criteria, providing a user interface for presentation at the mobile device, the user interface comprising an option for establishing a real-time communication channel to enable a live session between the mobile device and an external service to facilitate verification of the quantity corresponding to the media of exchange.

2. The method of claim 1, wherein the media of exchange comprises two or more notes, wherein at least a first portion of a first note of the two or more notes overlaps with a second portion of a second note of the two or more notes.

3. The method of claim 2, wherein the first note corresponds to a first currency and the second note corresponds to a second currency.

4. The method of claim 1, further comprising generating a feature vector based at least in part on the image information, and wherein the input comprises the feature vector.

5. The method of claim 1, wherein quantity of the media of exchange comprises a value of the media of exchange.

6. The method of claim 1, further comprising comparing the quantity to an expected quantity of the media of exchange.

7. The method of claim 6, further comprising receiving, from the mobile device, an indication of the expected quantity.

8. A remote computing device comprising:

one or more memories; and one or more processors in communication with the one or more memories and configured to execute instructions stored in the one or more memories to perform operations to:

receive, by the remote computing device and from a mobile device, image information representing an image that includes a depiction of a media of exchange;

provide, by the remote computing device, the image information as input to a machine learning model implemented by the remote computing device;

receive, by the remote computing device and from the machine learning model, an output comprising a classification and a confidence score, the classification comprising a quantity that corresponds to the media of exchange, the confidence score comprising a probability that the media of exchange in the image corresponds to the quantity;

compare, by the remote computing device, the confidence score with respect to one or more evaluation criteria; and in response to determining that the confidence score does not satisfy the one or more evaluation criteria, provide a user interface for presentation at the mobile device, the user interface comprising an option for establishing a real-time communication channel to enable a live session between the mobile device and an external service to facilitate verification of the quantity corresponding to the media of exchange.

9. The mobile device of claim 8, wherein the media of exchange comprises two or more notes, wherein at least a first portion of a first note of the two or more notes overlaps with a second portion of a second note of the two or more notes.

10. The mobile device of claim 9, wherein the first note corresponds to a first currency and the second note corresponds to a second currency.

11. The mobile device of claim 8, further comprising operations to generate a feature vector based at least in part on the image information, and wherein the input comprises the feature vector.

12. The mobile device of claim 8, wherein quantity of the media of exchange comprises a value of the media of exchange.

13. The mobile device of claim 8, further comprising comparing the quantity to an expected quantity of the media of exchange.

14. The mobile device of claim 13, further comprising operations to receive, from the mobile device, an indication of the expected quantity.

15. A non-transitory, computer-readable medium storing a plurality of instructions that, when executed by one or more processors of a remote computing device, cause the remote computing device to perform operations comprising:

receiving, from a mobile device, image information representing an image that includes a depiction of a media of exchange;

providing the image information as input to a machine learning model implemented by the remote computing device;

receiving, from the machine learning model, an output comprising a classification and a confidence score, the classification comprising a quantity that corresponds to the media of exchange, the confidence score comprising a probability that the media of exchange in the image corresponds to the quantity;

comparing the confidence score with respect to one or more evaluation criteria; and in response to determining that the confidence score does not satisfy the one or more evaluation criteria, provide a user interface for presentation at the mobile device, the user interface comprising an option for establishing a real-time communication channel to enable a live session between the mobile device and an external service to facilitate verification of the quantity corresponding to the media of exchange.

16. The non-transitory, computer-readable medium of claim 15, wherein the media of exchange comprises two or more notes, wherein at least a first portion of a first note of the two or more notes overlaps with a second portion of a second note of the two or more notes.

17. The non-transitory, computer-readable medium of claim 16, wherein the first note corresponds to a first currency and the second note corresponds to a second currency.

18. The non-transitory, computer-readable medium of claim 15, the operations further comprising generating a feature vector based at least in part on the image information, and wherein the input comprises the feature vector.

19. The non-transitory, computer-readable medium of claim 15, wherein quantity of the media of exchange comprises a value of the media of exchange.

20. The non-transitory, computer-readable medium of claim 15, the operations further comprising comparing the quantity to an expected quantity of the media of exchange.

* * * * *